US010339963B1

(12) United States Patent
Mader et al.

(10) Patent No.: US 10,339,963 B1
(45) Date of Patent: Jul. 2, 2019

(54) DETERMINING THERMAL GRADIENT OF A HAMR HOTSPOT USING PSEUDO-RANDOM BIT SEQUENCES RECORDED AT A STEPPED LASER POWER

(71) Applicant: Seagate Technology LLC, Cupertino, CA (US)

(72) Inventors: Drew Michael Mader, Bloomington, MN (US); Ian James Gilbert, Chanhassen, MN (US); Walter R. Eppler, Cranberry Township, PA (US); Tim Rausch, Farmington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/025,424

(22) Filed: Jul. 2, 2018

(51) Int. Cl.
| G11B 11/00 | (2006.01) |
| G11B 5/09 | (2006.01) |
| G11B 5/00 | (2006.01) |
| G11B 5/60 | (2006.01) |
| G11B 7/1263 | (2012.01) |
| G11B 7/1267 | (2012.01) |
| G11B 7/126 | (2012.01) |

(52) U.S. Cl.
CPC ............. *G11B 5/09* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| 6,671,232 B1* | 12/2003 | Stupp | G11B 5/012 |
| | | | 369/13.26 |
| 8,605,555 B1* | 12/2013 | Chernyshov | G11B 5/314 |
| | | | 369/13.33 |
| 8,891,341 B1* | 11/2014 | Krichevsky | G11B 5/02 |
| | | | 369/13.33 |
| 8,908,480 B1* | 12/2014 | Krichevsky | G11B 5/02 |
| | | | 369/13.26 |
| 9,240,205 B1 | 1/2016 | Gao et al. | |
| 9,830,942 B1* | 11/2017 | Mader | G11B 20/10481 |
| | | | 369/13.26 |
| 9,837,118 B1* | 12/2017 | Mader | G11B 5/012 |
| | | | 369/13.26 |
| 2003/0123335 A1* | 7/2003 | Rettner | B82Y 10/00 |
| | | | 369/13.24 |

* cited by examiner

*Primary Examiner* — Tan X Dinh
(74) *Attorney, Agent, or Firm* — Hollingsworth Davis, LLC

(57) ABSTRACT

Pseudorandom bit sequences are recorded to a heat-assisted recording medium at a laser power that is stepped while recording the pseudorandom bit sequences. The pseudorandom bit sequences are read from the heat-assisted recording medium to determine timing differences between bits written before and after the laser power is stepped. A thermal gradient of bits written to the heat-assisted recording medium is determined based on the timing differences.

20 Claims, 5 Drawing Sheets

DETERMINING THERMAL GRADIENT OF A HAMR HOTSPOT USING PSEUDO-RANDOM BIT SEQUENCES RECORDED AT A STEPPED LASER POWER

SUMMARY

The present disclosure is directed to determining the downtrack thermal gradient of a heat-assisted magnetic recording hotspot using pseudorandom bit sequences. In one embodiment, pseudorandom bit sequences are recorded to a heat-assisted recording medium at a laser power that is stepped while recording the pseudorandom bit sequences. The pseudorandom bit sequences are read from the heat-assisted recording medium to determine timing differences between bits mitten before and after the laser power is stepped. A thermal gradient of bits written to the heat-assisted recording medium is determined based on the timing differences.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
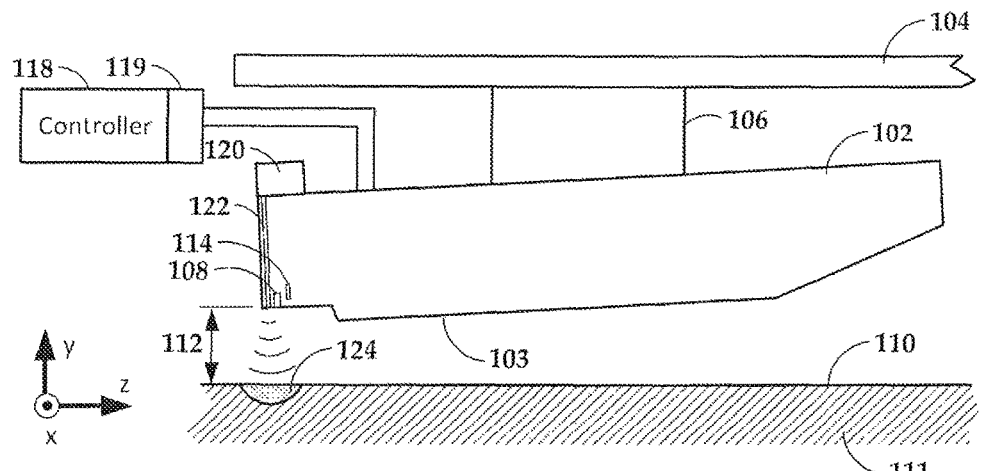
FIG. 1 is a view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into the optical spot in a recording layer. The hotspot raises the media temperature locally, reducing the writing magnetic field required for high-density recording. A waveguide integrated into a read/write head can be used to deliver light to the near-field transducer. Light from a light source, such as an edge-emitting laser diode mounted to an outside surface of the read/write head, is coupled into the waveguide through waveguide input coupler or a spot size converter.

Because the bit boundaries in a HAMR device are defined by the hotspot, the characteristics of the hotspot can have a significant effect on performance. For instance, the thermal gradient is the change in temperature over distance at the boundaries of the hotspot. A sharp thermal gradient, in which temperature changes a relatively large amount over a relatively small distance, results in a sharp magnetic transition at the boundary. These sharp transitions are strongly correlated to performance. For example, a sharp thermal gradient results in well-defined bit boundaries in the recorded tracks. The bits are therefore easier to detect and decode as well as being able to be placed closer together.

This disclosure describes techniques used to measure thermal gradient in a HAMR device. These techniques can be used in-drive, meaning they do not rely on external measuring devices (although can be used on a spin stand or other test equipment) and can be used during qualification testing and use of the drive. The described methods allow using lower laser currents, because the measurements do not rely on reading timing errors in the channel (detecting timing errors in the channel may involve using high laser power to get good bit error rate thereby providing accurate timing errors). Unlike previous techniques, the proposed techniques do not require any calibration in order to extract the phase shift. The phase shift is determined by analyzing the waveforms. These estimates of thermal gradient can be useful in testing and controlling HAMR components and drives.

In FIG. 1, a block diagram shows a side view of a HAMR read/write head 102 according to an example embodiment. The read/write head 102 may also be referred to herein as a head, a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to interface circuitry 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic pole that applies a magnetic field to the hotspot 124 and the surrounding area. Because of the high coercivity of the recording medium 111, only the hotspot 124 is affected by the magnetic field due to the hotspot 124 being heated above the Curie temperature. Therefore, the size and shape of the hotspot 124 affects the location of magnetic transitions written to the recording medium 111, which can affect the size and location of the bits of data defined by the transitions.

Figure 2:
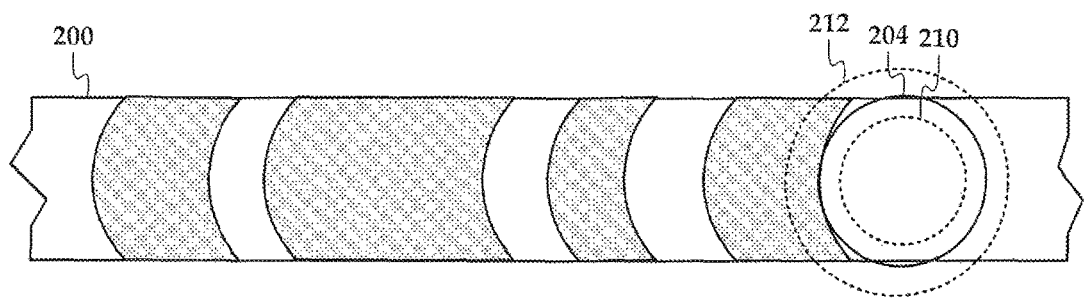
FIG. 2 is a diagram of recorded tracks according to an example embodiment.

A change in the laser's power while writing results in a shift of written bit boundaries (or a bit shift). This shift can be seen in both the downtrack and crosstrack direction of the data tracks. In FIG. 2, a diagram shows a track 200 according to an example embodiment. The differently-shaded areas in the tracks 200 represent regions of different magnetic orientation, the boundary between the regions representing the bit boundaries. Circle 204 represents a nominal hotspot size, e.g., a hotspot size that is optimal given the desired track width and linear bit density of the track 200. A downtrack shift in bit transition location may occur when the hotspot size decreases or increases, with or without a position shift. In such a case, the written transition is written later or earlier than expected because the thermal profile of the spot size has changed. This is indicated by dashed circles 210, 212, which indicate a hotspot at respective lower and higher values than nominal 204.

In a HAMR storage device, the thermal gradient can be estimated by stepping the laser current in the middle of a data wedge (e.g., changing the laser power using a stepwise function) and measuring the resulting bit shift. Generally, a data wedge includes a region that can be written continuously, generally being located between two servo wedges. The data wedge may include multiple data sectors and/or may be a single addressable unit of data. The thermal gradient can be estimated from Equation (1) below, where $T_w$ is the write temperature, $T_a$ is the ambient temperature, $A_\%$ is the fractional change in the laser current, and $\delta$ is the bit shift.

$$\frac{dT}{dx} = \frac{(T_w - T_a)A_\%}{\delta} \quad (1)$$

Note that this equation assumes that the bit shift varies linearly with $A_\%$, but second-order terms in $A_\%$ cancel when $\delta$ is averaged for measurements with positive and negative steps of the same magnitude.

The device induces a change in laser power by using code in the servo firmware that steps the laser current up or down in the middle of the wedge. Determining the thermal gradient involves writing a repeating periodic sequence and comparing all sequences to extract useful information. By comparing these waveforms of repeating sequences in time the bit shift can estimated, allowing for the measurement of the thermal gradient.

In one embodiment, the bit shift is measured by writing a pseudorandom bit sequence repeatedly to fill a data wedge and then capturing the read signal either with an oscilloscope or, in drive, by using channel oversampling. From the pseudorandom bit sequences written before the laser power change, the period of a noise-free pseudorandom bit sequence can be found, and consequently the timing of future pseudorandom bit sequences can be predicted. By comparing the predicted timing with the actual measured timing of the pseudorandom bit sequences after the laser power change, the bit shift caused by the change in laser power can be accurately determined.

Figure 3:
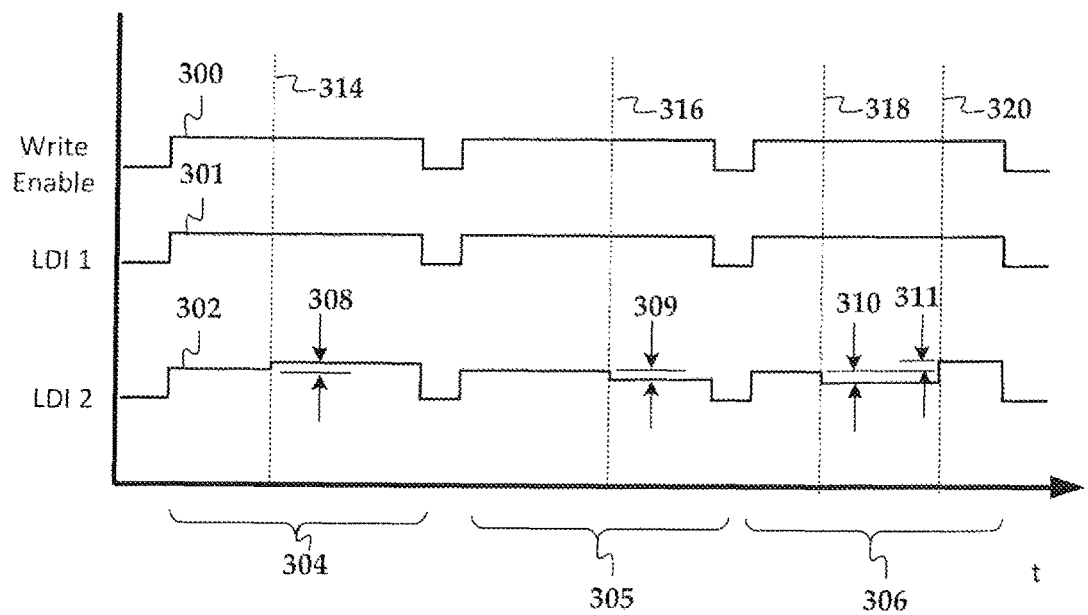
FIG. 3 is a graph showing stepping of laser power while writing according to an example embodiment.

In FIG. 3, a graph shows how the laser power can be set for pseudo-random bit sequences according to an example embodiment. In these examples, plots 301-302 represent an input to a digital-to-analog converter (DAC) that sets laser current (LDI), the LDI corresponding to the power output by the laser. Note that other embodiments may effect a change to laser power by changing a voltage applied to the laser. Plot 300 represents a write enable signal, which enables the laser and other write transducer components (e.g., write coil, write heater, etc.). Plot 301 shows that the laser power is set to a fixed value while recording a wedge of data to a heat-assisted magnetic recording medium, as in standard operation of a HAMR drive. Note that the laser power in each of time periods 304-306 may be different, e.g., due to laser calibration that is performed when the write enable 300 is off. Within each time period 304-306, however, the DAC input of plot 301 is fixed.

Plot 302 shows the laser power being stepped while recording a pseudo-random bit sequence to a data wedge of the recording medium. In time periods 304 and 305, the laser power exhibits a respective positive and negative step. The pre-step timing is measured before time 314 in time period 304 and after time 316 in time period 305. The post-step measurements are made after times 314, 316 in these cases. In time period 306, the laser power exhibits both a positive and a negative step, starting at times 318 and 320, respectively. Any number combination of steps may be used when recording the pseudo-random bit sequences. Further, the step values (e.g., step values 308, 309) may be the same or different in positive and negative directions, and the step values may differ between each time period.

In another embodiment, two sets of waveforms may be captured, one from wedges written with constant laser current 301 and one from wedges written with laser current at a higher current, e.g., curve 301 increased by the step value 308, or decreased by step value 309. After aligning the waveforms from the wedges without the step with the waveforms of stepped value waveforms, the timing differences between the unstepped and stepped waveforms may be compared to determine the bit shift.

Figure 4:
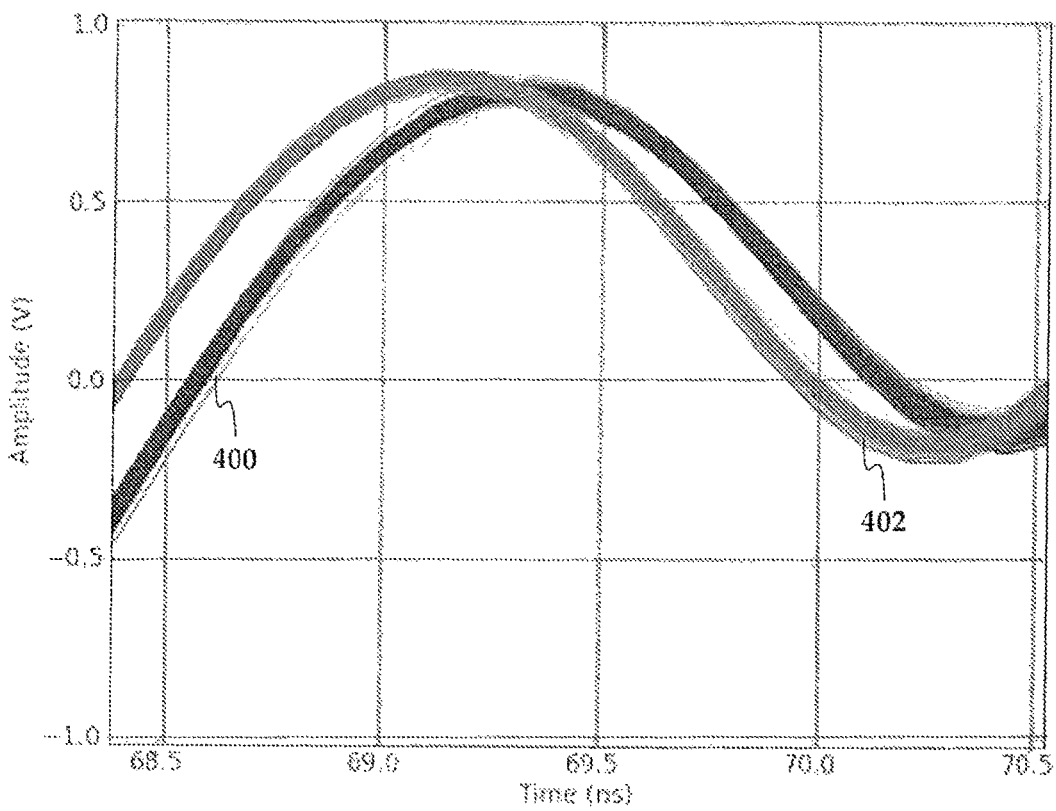
FIG. 4 is a graph showing a shift in bit timings of pseudorandom bit sequences according to an example embodiment.

In FIG. 4, a graph shows parts of the individual pseudo-random bit sequence waveforms before (400) and after (402) the laser current step 308. There is some spread among the pre- and post-step pseudorandom bit sequences, but there is a clear time delay between the two groups, which is the bit shift caused by the change in laser power. The time delay is calculated by averaging the pre-step pseudorandom bit sequences together and the post-step pseudorandom bit sequences together to remove jitter and then determining the time delay that maximizes the correlation coefficient for the two waveforms. The time delay is converted to distance (e.g., using measurements of track radial location and rotational speed of the disk) and then used in Equation (1) to determine the thermal gradient.

The bit shift measurement described in the previous paragraph may be subject to systematic biases, some of which can be removed with additional analysis. First, the derivation of Equation (1) involves taking a Taylor series expansion of the bit shift with respect to the fractional change in laser power and keeping only the first-order term This effect can be largely eliminated by averaging the magnitude of the bit shift measured with and equal number of positive and negative laser current steps (e.g., steps 308 and 309 in FIG. 3) of the same amplitude.

Figure 5:
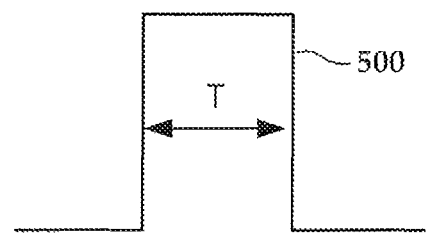
FIGS. 5 and 6 are diagrams showing a dibit and associated dibit response according to an example embodiment.
Figure 6:
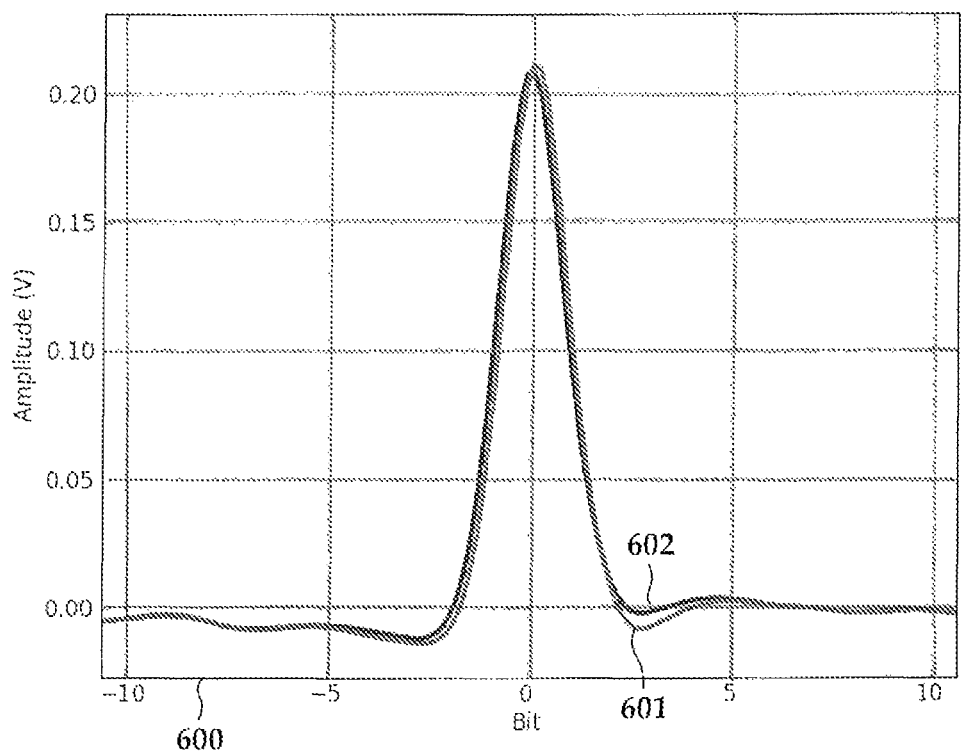

Second, the change in laser power also changes the dibit (impulse) response of the head/media system. Any change in odd symmetry part of the dibit response will also introduce a bit shift which pollutes the measurement of the thermal gradient. In FIGS. 5 and 6, diagrams show an example dibit and dibit response that may be used in compensating for change in impulse response due to stepped change in laser power. A dibit 500 as seen in FIG. 5 includes two transitions separated by a bit period T. The channel response to the dibit, as shown in graph 600 of FIG. 6, provides information on various distortions in the system. For example, traces 601 and 602 illustrate a change in odd symmetry that can be measured and used to adjust bit shift before determining thermal gradient.

A pseudorandom bit sequence can correct for changes in impulse response due to the stepped laser power using the dibit response. Using the averaged pre-step and post-step pseudorandom bit sequence signals, the dibit response of the system before and after the laser power jump can be extracted using methods such as those described in Ozgunes and Eppler, *IEEE Trans. Magn.* 39, 2225 (2003). An ideal signal can then be constructed by shifting the two dibit responses to maximize their correlation, convolving the shifted dibit responses with the sequence of ±1's in a pseudorandom bit sequence, and then measuring the bit shift in these two calculated signals. Because the dibit responses are aligned in time after this shifting based on dibit response, any additional bit shift that is measured is due to changes in the odd part of the dibit response due to the laser power step and can be removed from the total bit shift used to calculate the thermal gradient. Experimentally it has been found that dibit response correction to the bit shift can be several percent.

The pseudorandom bit sequence-based thermal gradient measurement technique described above has a number of advantages over existing techniques. First, it eliminates the systematic bias in the measured bit shift due to changes in the dibit response due to the changes in laser power. Second, the technique is less sensitive to jitter than other methods (for example, H. J. Richter, C. C. Poon, G. Parker, M. Staffaroni, O. Mosendz, R. Zakai, and B. C. Stipe, *IEEE Trans. Magn.* 49, 5378 (2013)) based on laser power steps because the time base is much longer. The time base of the pseudorandom bit sequence method is the length of the pseudorandom bit sequence (typically 63-255 bits, but wider ranges can be used, e.g., 31 to 511 bits) instead of a few bits for a single tone. Third, the technique works at very low modulation amplitudes (typically 1.5-3% of steady state current, but can range from 0.5% to 10% in some scenarios), so it perturbs the head/media system less than other techniques, which usually modulate the laser current by 5-6%. Finally, because the pseudorandom bit sequence method does not use timing from the channel, it works at lower BER.

Figure 7:
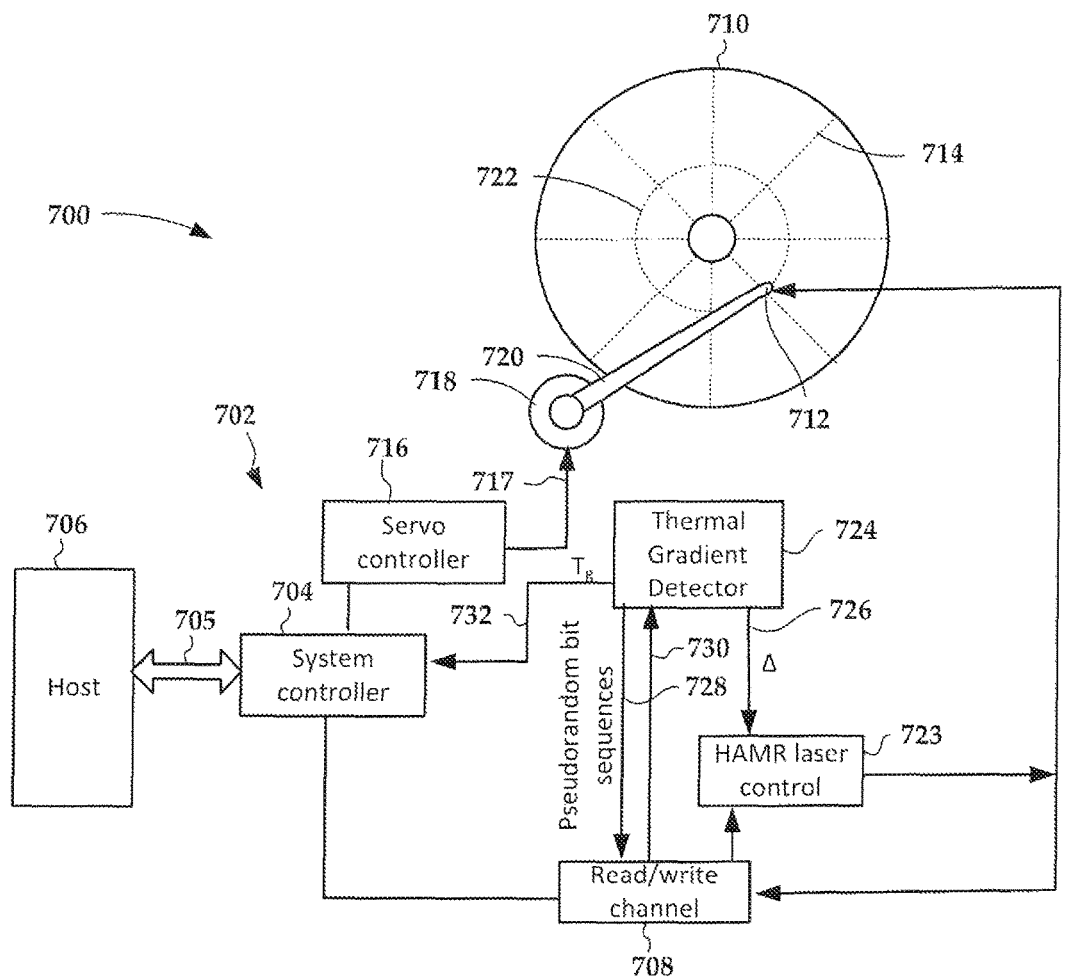
FIG. 7 is a block diagram of an apparatus according to an example embodiment.

In FIG. 7, a block diagram illustrates a system and apparatus 700 according to an example embodiment. The apparatus/system 700 may include a self-contained disk drive or a test fixture, e.g., for testing HAMR read/write heads and/or media. Control logic circuit 702 of the apparatus includes a system controller 704 that processes read and write commands and associated data from a host device 706. The host device 706 may include any electronic device that can be communicatively coupled via host interface 705 to store and retrieve data from a data storage device, e.g., a computer, peripheral card, etc. The data controller 704 is coupled to a read/write channel 708 that reads from and writes to a surface of a magnetic disk 710.

The read/write channel 708 generally converts data between the digital signals processed by the data controller 704 and the analog signals conducted through one or more read/write heads 712 during read operations. To facilitate the read operations, the read/write channel 708 may include analog and digital circuitry such as preamplifiers, filters, decoders, digital-to-analog converters, timing-correction units, etc. The read/write channel 708 also provides servo data read from servo wedges 714 on the magnetic disk 710 to a servo controller 716. The servo controller 716 uses these signals to provide a voice coil motor control signal 717 to an actuator 718. The actuator 718 moves an arm 720 upon which the read/write heads 712 are mounted in response to the voice coil motor control signal 717.

The apparatus/system 700 is capable of HAMR recording, and therefore the read/write heads 712 include an energy source (e.g., laser diode) that heats the magnetic disk 710 when recording. A HAMR laser controller 723 sends a current to activate the laser diode when recording. As will be described below, the HAMR laser controller 723 includes the ability to shift a steady-state current being applied to the laser while recording pseudorandom bit sequences 728.

The apparatus/system 700 includes a thermal gradient detector 724 that can estimate the thermal gradient of hotspots written to the disk 710 via the laser. The thermal gradient detector 724 applies a laser current shift 726 while pseudorandom bit sequences 728 to one or more segments (e.g., tracks) of the disk 710. When reading back the pseudorandom bit sequences 730, the thermal gradient detector 724 uses the difference in timing between the bits written before and after the laser current shift 726 to estimate the thermal gradient.

The system controller 104 can use this thermal gradient data for, among other things, evaluation and calibration of the drive during qualification testing, performance testing during use of the drive, etc. The detector 724 allows an in-drive measurement of the thermal gradient and/or a spin stand measurement. A drive measurement is faster and cheaper, and therefore can provide large scale feedback. The estimated thermal gradient provides a metric of performance, one which is a good predictor of recorded data quality, e.g., bit error rate. The detector 724 can also be used in the field to predict health of a fielded drive, e.g., when a drive is about to fail, is in need of a calibration and/or other changes.

In some embodiments, the detector 724 and other functional components may be part of a test fixture system. The fixture may be configured to test entire drive assemblies, or separate parts of drives such as heads 712 and media 710. In such a case, the timings determined from the read back pseudorandom bit sequences 730 may be obtained by an oscilloscope or other test equipment. The test setup may include features not seen in the production drive, such as separate head for writing to and reading from the disk 710. The testing may include qualification testing of each part and/or random sample testing for statistical process validation.

Figure 8:
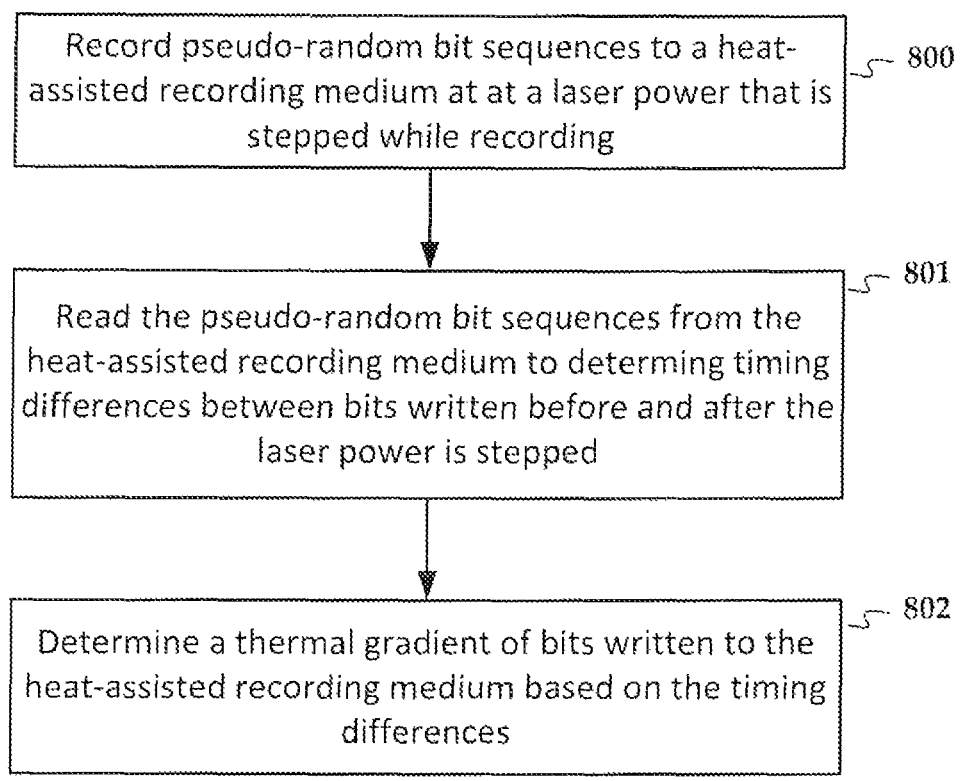
FIG. 8 is a flowchart of a method according to an example embodiment.

In reference now to FIG. 8, a flowchart illustrates a method according to an example embodiment. The method involves recording 800 pseudo-random bit sequences to a heat-assisted recording medium at a laser power that is stepped while recording the pseudo-random bit sequences. The pseudo-random bit sequences are read 801 from the heat-assisted recording medium to determine timing differences between bits written before and after the laser power is stepped. A thermal gradient of bits written to the heat-assisted recording medium is determined 802 based on the timing differences.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    recording pseudorandom bit sequences to a heat-assisted recording medium at a laser power that is stepped while recording the pseudorandom bit sequences;
    reading the pseudorandom bit sequences from the heat-assisted recording medium to determine timing differences between bits written before and after the laser power is stepped; and
    determining a thermal gradient of bits written to the heat-assisted recording medium based on the timing differences.

2. The method of claim 1, wherein reading the pseudo-random bit sequences comprises oversampling a signal generated by a read transducer that reads the pseudorandom bit sequences.

3. The method of claim 1, wherein determining the thermal gradient comprises determining $(T_w-T_a)A_\%/\delta$, where $T_w$ is a write temperature of the recording medium, $T_a$ is an ambient temperature, $A_\%$ is a fractional change between the first and second laser currents, and $\delta$ is a bit shift based on the timing differences between the bits written before and after the laser current is stepped.

4. The method of claim 1, wherein the laser power is stepped in both a positive and negative direction while recording the pseudo-random bit sequences.

5. The method of claim 4, wherein determining a first bit shift magnitude based on the laser power stepped in the negative direction and a second bit shift magnitude based on the laser power stepped in the positive direction; the second bit timings being determined based on an average of the first and second bit shift magnitudes.

6. The method of claim 1, further comprising:
    determining first and second dibit responses from readback waveforms of the pseudo-random bit sequences;
    shifting the first and second dibit responses to maximize their correlation; and
    determining the timing difference based on a convolution of the shifted first and second dibit responses with the pseudorandom bit sequences.

7. The method of claim 1, wherein the pseudorandom bit sequences are between 31 and 511 bits.

8. The method of claim 1, wherein the laser power is stepped by 0.5 to 10% of a steady state value while recording the pseudo-random bit sequence.

9. The method of claim 1, wherein the pseudorandom bit sequences are written to a series of data wedges.

10. An apparatus; comprising:
    interface circuitry configured to communicate with at least one head that writes to and reads from a heat-assisted, recording medium; and
    a controller coupled to the interface circuitry and operable to:
        record pseudorandom bit sequences to the recording medium at a laser power of the head that is stepped while recording;
        read the pseudorandom bit sequences from the recording medium via the head to determine a timing difference between first bits written before the laser current is stepped and second bits written after the laser current is stepped; and
        determine a thermal gradient of bits written to the recording medium based on the timing difference.

11. The apparatus of claim 10, wherein reading the pseudo-random bit sequences comprises oversampling a signal generated by a read transducer that reads the first and second pseudo-random bit sequences.

12. The apparatus of claim 10, wherein determining the thermal gradient comprises determining $(T_w-T_a)A_\%/\delta$, where $T_w$ is a write temperature of the recording medium, $T_a$ is an ambient temperature, $A_\%$ is a fractional change between the first and second laser currents, and $\delta$ is a bit shift based on the timing difference.

13. The apparatus of claim 10, wherein the laser power is stepped in both a positive and negative direction while recording the pseudo-random bit sequences.

14. The apparatus of claim 13, wherein determining a first bit shift magnitude based on the laser power stepped in the negative direction and a second bit shift magnitude based on the laser power stepped in the positive direction, the second bit timings being determined based on an average of the first and second bit shift magnitudes.

15. The apparatus of claim 10, wherein the controller is further operable to:
    determine first and second dibit responses of the first and second bits written respectively before and after the laser current is stepped;
    shift the first and second dibit responses to maximize their correlation; and
    determine the timing difference based on a convolution of the shifted first and second dibit responses with the respective first and second bits.

16. The apparatus of claim 10, wherein the first and second pseudorandom bit sequences are between 31 and 511 bits.

17. The apparatus of claim 10, wherein the laser power is stepped by 0.5-10% of a steady state value while recording the second pseudo-random bit sequence.

18. A system comprising:
    a heat-assisted, recording medium;
    at least one head operable to write to and read from the recording medium; and a controller coupled to the head, the controller operable to:
  record pseudorandom bit sequences to the recording medium at a laser power of the head that is stepped while recording the pseudo-random bit sequences;
  read the pseudo-random bit sequences from the recording medium via the head to determine respective bit timings before and after the laser power step; and
  determine a thermal gradient of bits written to the recording medium based on a timing difference.

19. The system of claim 18, further comprising an oscilloscope that determines the first and second bit timings.

20. The system of claim 18, wherein determining the thermal gradient comprises determining $(T_w-T_a)A_{\%}/\delta$, where $T_w$ is a write temperature of the recording medium, $T_a$ is an ambient temperature, $A_{\%}$ is a fractional change between the first and second laser currents, and $\delta$ is a bit shift based on the timing difference.

* * * * *